United States Patent
Yamaura

(10) Patent No.: US 11,855,338 B2
(45) Date of Patent: Dec. 26, 2023

(54) RADAR DEVICE

(71) Applicant: DENSO CORPORATION, Kariya (JP)

(72) Inventor: Shinji Yamaura, Kariya (JP)

(73) Assignee: DENSO CORPORATION, Kariya (JP)

( * ) Notice: Subject to any disclaimer, the term of this patent is extended or adjusted under 35 U.S.C. 154(b) by 435 days.

(21) Appl. No.: 17/237,338

(22) Filed: Apr. 22, 2021

(65) Prior Publication Data

US 2021/0242577 A1 Aug. 5, 2021

Related U.S. Application Data

(63) Continuation of application No. PCT/JP2019/043064, filed on Nov. 1, 2019.

(30) Foreign Application Priority Data

Nov. 19, 2018 (JP) .................. 2018-216492

(51) Int. Cl.
| | |
|---|---|
| *H01Q 1/32* | (2006.01) |
| *G01S 7/03* | (2006.01) |
| *G01S 13/93* | (2020.01) |
| *G01S 13/931* | (2020.01) |
| *H01Q 3/34* | (2006.01) |

(52) U.S. Cl.
CPC ......... *H01Q 1/3233* (2013.01); *G01S 13/931* (2013.01); *H01Q 3/34* (2013.01); *G01S 2013/93271* (2020.01)

(58) Field of Classification Search
CPC ........ G01S 13/93; G01S 13/931; G01S 13/86; G01S 13/70; G01S 13/72; G01S 2013/93271; G01S 7/02; G01S 7/021; G01S 7/022; G01S 7/03; H01Q 1/32; H01Q 1/3233; H01Q 13/20; H01Q 13/206; H01Q 21/00; H01Q 21/06; H01Q 3/34; H01Q 3/44; H01Q 3/443
See application file for complete search history.

(56) References Cited

U.S. PATENT DOCUMENTS

| | | | | |
|---|---|---|---|---|
| 10,403,983 | B2* | 9/2019 | Lim | H04B 7/043 |
| 10,573,959 | B2* | 2/2020 | Alland | H01Q 3/28 |
| 10,852,407 | B2* | 12/2020 | Koerber | G01S 7/032 |
| 11,435,438 | B2* | 9/2022 | Emadi | H01Q 3/247 |
| 11,474,196 | B2* | 10/2022 | Sanada | G01S 7/03 |
| 11,532,869 | B2* | 12/2022 | Spalink | H01Q 21/08 |
| 11,579,246 | B2* | 2/2023 | Lee | G01S 13/931 |

(Continued)

FOREIGN PATENT DOCUMENTS

EP 2 315 311 A1 4/2011

*Primary Examiner* — Tho G Phan

(74) *Attorney, Agent, or Firm* — POSZ LAW GROUP, PLC

(57) ABSTRACT

A radar device includes: a transmitting antenna having at least one element antenna; and a receiving antenna having a plurality of element antennas. The plurality of element antennas of the receiving antenna are arranged at different positions in a first direction and a second direction perpendicular to the first direction. A distance between two adjacent element antennas among the plurality of element antennas of the receiving antenna in the first direction is equal to each other. A distance between two adjacent element antennas among the plurality of element antennas of the receiving antenna in the second direction is equal to each other.

9 Claims, 16 Drawing Sheets

(56) References Cited

U.S. PATENT DOCUMENTS

| | | |
|---|---|---|
| 2010/0075618 A1 | 3/2010 | Isaji |
| 2010/0123616 A1 | 5/2010 | Minami |
| 2011/0074620 A1 | 3/2011 | Wintermantel |
| 2011/0074621 A1 | 3/2011 | Wintermantel |
| 2011/0080313 A1 | 4/2011 | Wintermantel et al. |
| 2011/0080314 A1 | 4/2011 | Wintermantel |
| 2016/0282450 A1 | 9/2016 | Kishigami et al. |
| 2016/0291146 A1 | 10/2016 | Wang et al. |
| 2017/0082730 A1 | 3/2017 | Kishigami et al. |

* cited by examiner

RADAR DEVICE

CROSS REFERENCE TO RELATED APPLICATION

The present application is a continuation application of International Patent Application No. PCT/JP2019/043064 filed on Nov. 1, 2019, which designated the U.S. and claims the benefit of priority from Japanese Patent Application No. 2018-216492 filed on Nov. 19, 2018. The entire disclosures of all of the above applications are incorporated herein by reference.

TECHNICAL FIELD

The present disclosure relates to a radar device.

BACKGROUND

Since a vehicle radar device requires a detection function in the horizontal direction, that is, in the right-left direction in order to detect an object such as another vehicle in front of the vehicle, a large number of receiving antennas are arranged at equal intervals in the horizontal direction. As a result, the required detection resolution in the horizontal direction is obtained. In recent years, as a radar device for vehicles, a detection function in the vertical direction, that is, in the up-down direction has also been required. In particular, in applications for monitoring the situation at intersections and for mounting on mobile bodies other than vehicles, such as drones, the detection range and detection resolution in the vertical direction equivalent to those in the horizontal direction are required.

SUMMARY

According to an example embodiment, a radar device includes: a transmitting antenna having at least one element antenna; and a receiving antenna having a plurality of element antennas. The plurality of element antennas of the receiving antenna are arranged at different positions in a first direction and a second direction perpendicular to the first direction. A distance between two adjacent element antennas among the plurality of element antennas of the receiving antenna in the first direction is equal to each other. A distance between two adjacent element antennas among the plurality of element antennas of the receiving antenna in the second direction is equal to each other.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Some conceivable radar devices for vehicles have a configuration in which a few sets of receiving antennas are arranged in the vertical direction. In this configuration, the angle of one object can be detected even in the vertical direction, but there is a difficulty that it may not be sufficiently detected when two or more objects are present.

Figure 3:
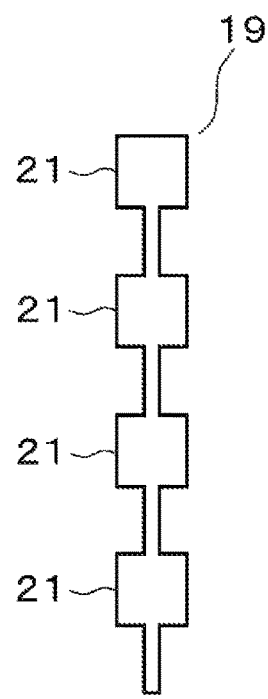
FIG. 3 is a diagram showing an example of an element antenna.
Figure 5:
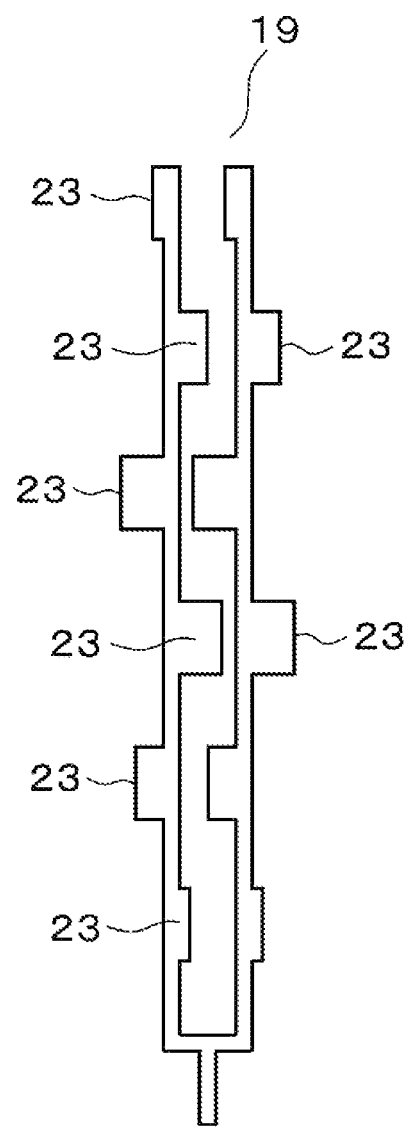
FIG. 5 is a diagram showing another example of the element antenna.

Further, according to a conceivable technique, the separation ability in the vertical direction can be obtained by arranging a plurality of transmitting/receiving antennas at various horizontal and vertical positions. In this configuration, it is required that either antenna is arranged in the vertical direction at an interval of about ½ of the wavelength λ of the radio wave. Therefore, it is not possible to connect a large number of patch antennas as shown in FIG. 3 to increase the antenna gain. Further, in the above configuration, it is also required that either antenna is arranged similarly in the horizontal direction at an interval of about ½ of the wavelength λ of the radio wave. Therefore, it is not possible to increase the gain by connecting in parallel as shown in FIG. 5.

In view of the above points, a radar device is provided with obtaining a detection range and a detection resolution in the vertical direction equivalent to those in the horizontal direction, increasing the degree of freedom in antenna shape, and using an antenna array according to a desired gain and detection range, so that the radar device can achieve both resolution and detection distance/range.

In one aspect of the embodiments, the radar device includes a transmission antenna having at least one element antenna and a reception antenna having a plurality of element antennas. The plurality of element antennas of the reception antenna are arranged at different positions in the first direction and the second direction perpendicular to the first direction. Distances of two adjacent element antennas among the plurality of element antennas of the reception antenna in the first direction are equal to each other. Distances of two adjacent element antennas among the plurality of element antennas of the reception antenna in the second direction are equal to each other.

First Embodiment

Figure 1:
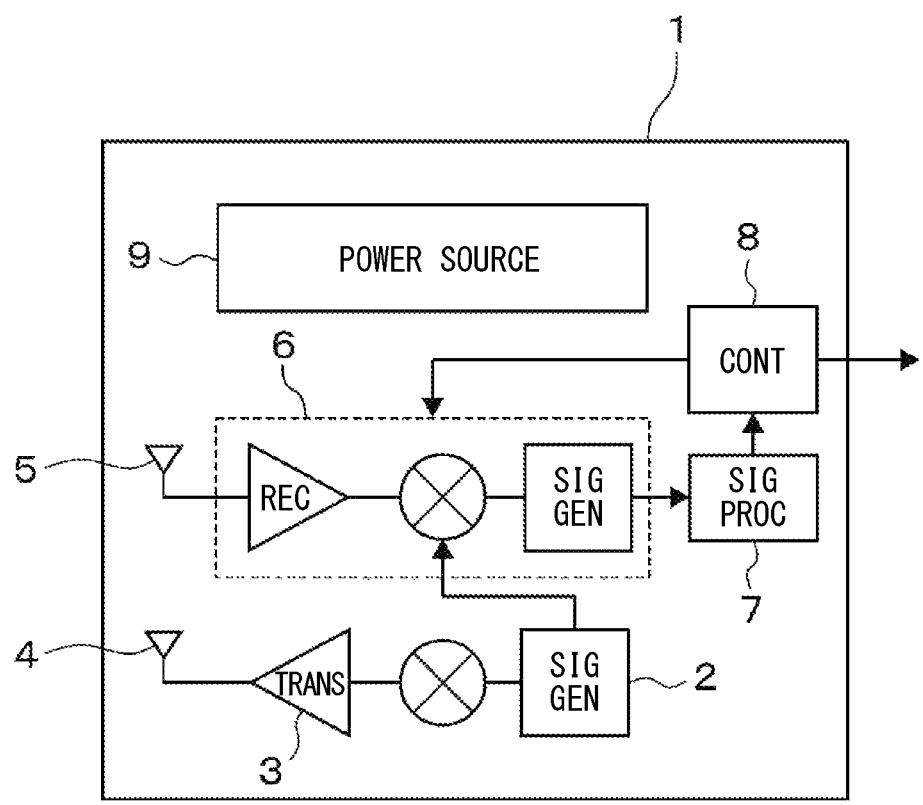
FIG. 1 is a functional block diagram of a radar device according to a first embodiment.

Hereinafter, a first embodiment of the present disclosure will be described with reference to FIGS. 1 to 7. The radar device 1 of the present embodiment is, for example, a radar device for a vehicle mounted on a vehicle. As shown in FIG. 1, the radar device 1 includes a signal generator 2, a transmitter 3, a transmission antenna 4, a reception antenna 5, a receiver 6, a signal processor 7, a controller 8, and a power source 9.

The signal generator 2 generates and outputs a reference signal for generating radio waves for radar. The signal generator 2 generates, for example, a reference signal with an FCM (Fast Chirp Modulation) waveform whose frequency changes in a sawtooth shape. The transmitter 3 inputs a reference signal from the signal generator 2, generates a radio wave for radar based on the input reference signal, and transmits the wave from the transmission antenna 4. The transmitter 3 converts the reference signal output from the signal generator 2 into a signal having a frequency range and power specified by the Radio Wave Law and outputs the signal. The transmitting antenna 4 inputs the signal converted by the transmitter 3 and emits a radio wave for radar having a desired power distribution in a desired radiation range.

The receiving antenna 5 receives the reflected radio wave reflected by a target such as an obstacle or an object in front of the vehicle. The receiver 6 inputs the received signal from the receiving antenna 5 and the reference signal from the signal generator 2, and generates a signal for calculating the position, speed, and the like of the target based on the input signals.

The signal processor 7 inputs the signal from the receiver 6, performs signal processing based on the input signal, and calculates the position of the target. The controller 8 has a function of controlling on/off of transmission of radar transmission radio waves, modulation, and the like, and a function of transmitting a signal calculated by the signal processor 7 to an external device. The power source 9 provides the power supply required and shared for each unit of the radar device 1.

In the present embodiment, the received radio wave of the radar device 1, that is, the reflected radio wave reflected by the target may be regarded as a plane wave. Then, in order to estimate the arrival direction of the plane wave which is the received radio wave, the normal vector of the plane or two or more first-order independent vectors constituting the plane may be obtained. In view of this feature, in the present embodiment, three or more receiving antennas are provided, and these three or more receiving antennas are configured such that two or more direction vectors configured with one of them as a reference are linearly independent, so that the arrival direction of the received radio wave can be estimated not only in the horizontal direction but also in the vertical direction.

Figure 2:
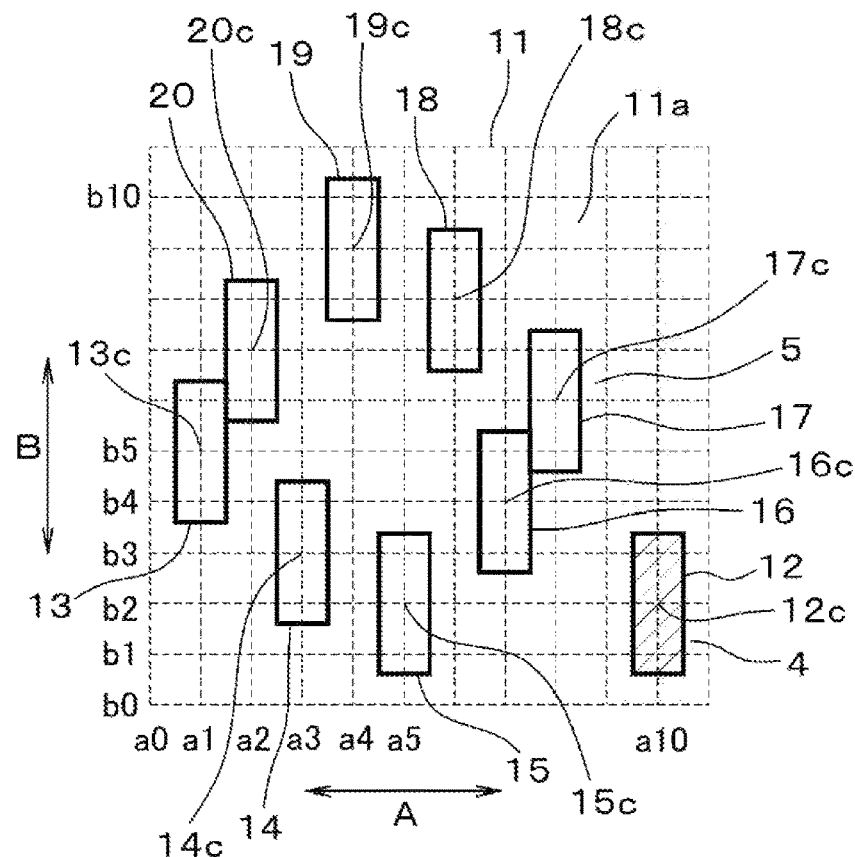
FIG. 2 is a diagram illustrating an arrangement form of a transmitting antenna and a receiving antenna.

Here, an example of the transmitting antenna 4 and the receiving antenna 5 will be described with reference to FIGS. 2 and 3. In the present embodiment, the transmitting antenna 4 and the receiving antenna 5 are arranged on one substrate 11. In the case of this configuration, the substrate 11 is used upright, and the plane of the substrate 11, that is, the plane shown in FIG. 2 is arranged so as to face the front of the vehicle with the front surface 11a. As shown in FIG. 2, on the front surface 11a of the substrate 11, the direction of arrow A corresponds to the first direction, i.e., for example, the horizontal direction, that is, the right-left direction, and the direction of arrow B is perpendicular to the first direction, and corresponds to the second direction, that is, for example, the vertical direction, i.e., the up-down direction.

A transmitting antenna 4 having one element antenna 12 is arranged in, for example, the right lower corner of the front surface 11a of the substrate 11, and the receiving antenna 5 having a plurality of, for example, eight element antennas 13 to 20 is arranged in another region on the front surface 11a of the substrate 11. Each element antenna 12 to 20 has, for example, the same configuration and has a plurality of patch antennas. As shown in FIG. 3, an example of a specific configuration of each element antenna 12 to 20 is configured by connecting, for example, four square-shaped patch antennas 21 in series, for example, in a row. The number of patch antennas 21 is not limited to 4, and the number is determined by a desired detection distance, an angle range, etc., and may be 5 or more, or 3 or less. Although an example of series connection is shown here, parallel connection may be used.

Figure 4:
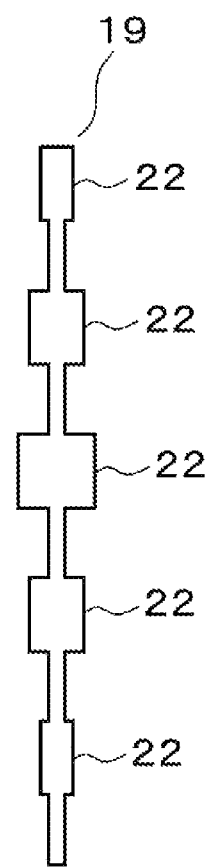
FIG. 4 is a diagram showing another example of the element antenna.

Further, FIGS. 4 and 5 show other examples of each element antenna 12 to 20. In the configuration shown in FIG. 4, for example, five patch antennas 22 having different shapes and sizes are arranged in an array. In the configuration shown in FIG. 5, for example, six patch antennas 23 connected in series in one row are arranged in two rows, and one end thereof is connected. The shape and size of such patch antenna arrays 22 and 23 are determined in the process of optimizing the radiation pattern of radio waves from the antenna. Further, depending on the desired detection distance and angle range, a plurality of patch antennas connected in series in one row may be arranged in three or more rows.

Next, the arrangement positions of the eight element antennas 13 to 20 of the receiving antenna 5 will be described with reference to FIG. 2. First, the lower left corner of the substrate 11 is set as the origin of (a0, b0), and the coordinates of (a1, b0), (a2, b0), (a3, b0), and the like and the coordinates of (a0, b1), (a0, b2), (a0, b3), and the like are set in the horizontal direction A and the vertical direction B. In this coordinate system, the vertical and horizontal intervals of the grid shown by the broken line are set to, for example, ½ of the wavelength λ of the radio wave for radar. The vertical and horizontal intervals of the grid may be set to an appropriate length different from the length of ½ of the wavelength λ. In the case of the above configuration, the center 12c of the element antenna 12 which is the transmitting antenna 4 is arranged at the coordinates (a10, b2).

Regarding the eight element antennas 13 to 20 of the receiving antenna 5, the center 13c of the first element antenna 13 is arranged at the coordinates (a1, b5), and the center 14c of the second element antenna 14 is arranged at the coordinates (a3, b3), the center 15c of the third element antenna 15 is arranged at the coordinates (a5, b2), and the center 16c of the fourth element antenna 16 is arranged at the coordinates (a7, b4). Then, the center 17c of the fifth element antenna 17 is arranged at the coordinates (a8, b7), the center 18c of the sixth element antenna 18 is arranged at the coordinates (a6, b8), and the center 19c of the seventh element antenna 19 is arranged at the coordinates (a4, b9), and the center 20c of the eighth element antenna 20 is arranged at the coordinates (a2, b7).

In the case of the present embodiment, by arranging the eight element antennas 13 to 20 of the receiving antenna 5 as described above, the eight element antennas 13 to 20 are arranged at different positions in the first direction corresponding to, for example, the horizontal direction, that is, the right-left direction, and the second direction perpendicular to the first direction and corresponding to, for example, the vertical direction, that is, the up-down direction. Further, the eight element antennas 13 to 20 are arranged so that the horizontal distances of the two adjacent element antennas are equal to each other and the vertical distances of the two adjacent element antennas are equal to each other.

Further, in the present embodiment, the arrangement form of the eight element antennas 13 to 20 is configured to be an arrangement form close to a substantially circular shape. Further, the arrangement form of the eight element antennas 13 to 20 is configured to be point-symmetrical.

Figure 6:
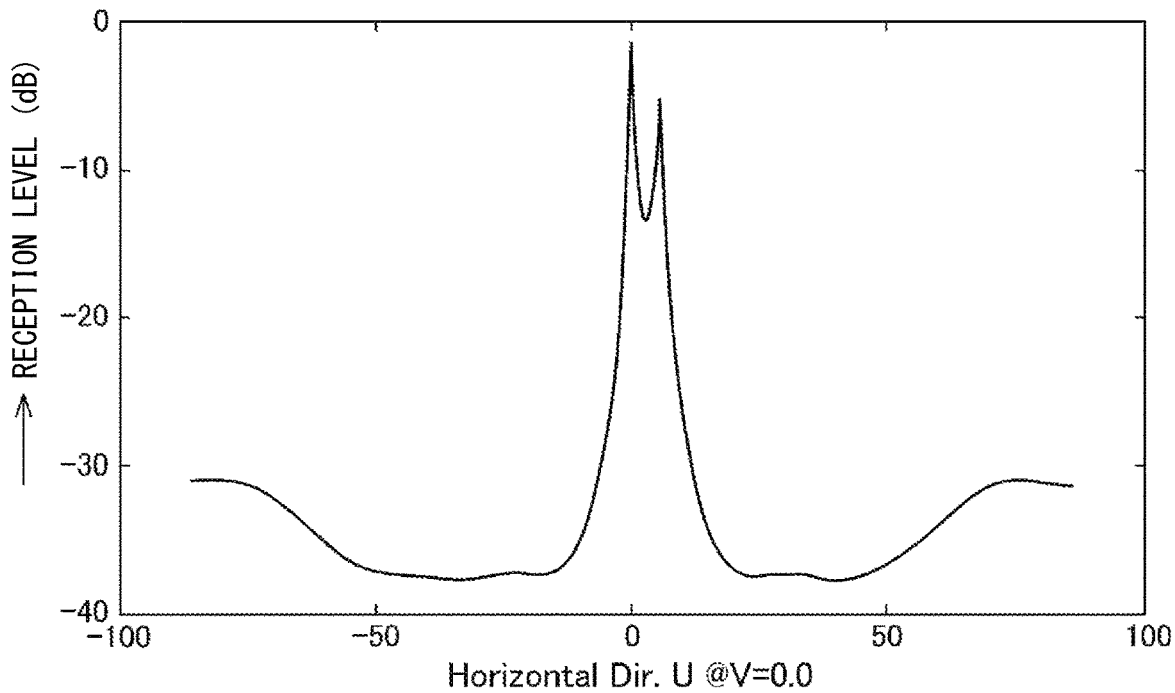
FIG. 6 is a characteristic diagram showing a detection range and a detection level in the horizontal direction of the receiving antenna.
Figure 7:
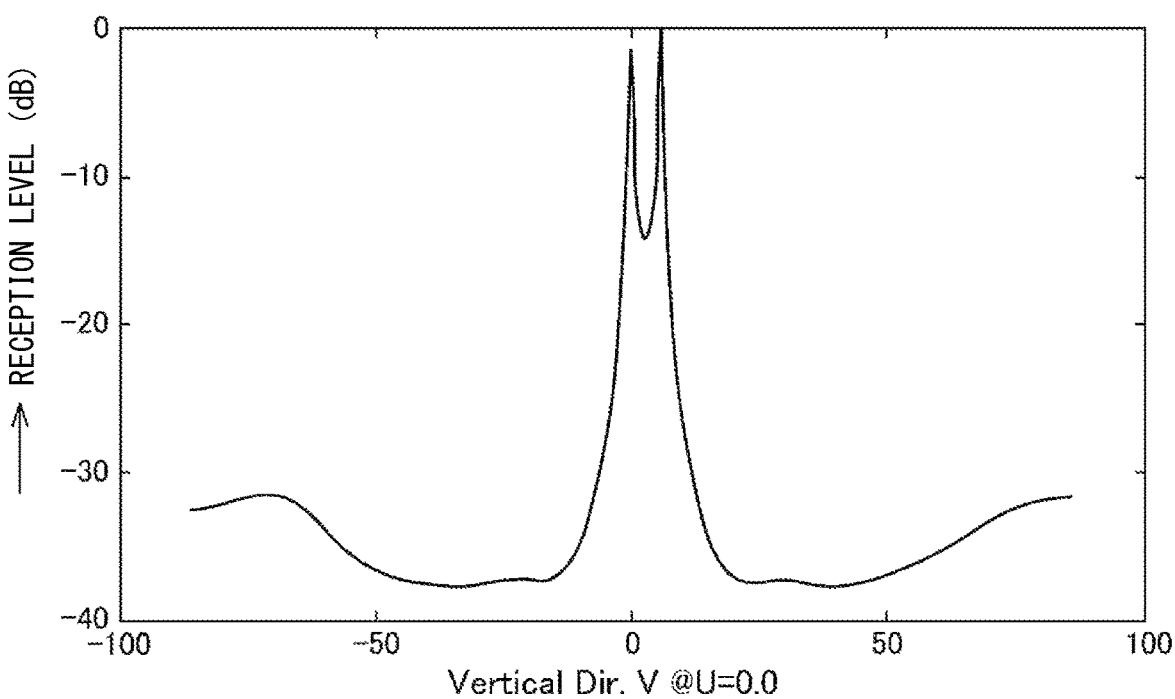
FIG. 7 is a characteristic diagram showing a detection range and a detection level in the vertical direction of the receiving antenna.

The results of simulating the reception operation of the receiving antenna 5 of the radar device 1 of the present embodiment are shown in FIGS. 6 and 7. In this simulation, targets are placed at the origins (0, 0) in the horizontal and vertical directions, the positions at (6.0°, 0), and the positions at (0, 6.0°), and each target reflects the radio wave, and the reflected radio wave is received by the receiving antenna 5 of the present embodiment, and the received signal is examined. FIG. 6 is a characteristic diagram showing the horizontal detection range and detection level of the receiving antenna 5 of the present embodiment, that is, the receiving level. FIG. 7 is a characteristic diagram showing a detection range and a detection level in the vertical direction of the receiving antenna 5 of the present embodiment. From FIGS. 6 and 7, it can be confirmed that the receiving antenna 5 of the radar device 1 of the present embodiment has a detection resolution in the vertical direction equivalent to that in the horizontal direction. Further, according to the present embodiment, the degree of freedom in the shape of the antenna can be increased, and an antenna array corresponding to a desired gain and detection range can be used. Therefore, it is possible to achieve both resolution and detection distance/range.

Second Embodiment

Figure 8:
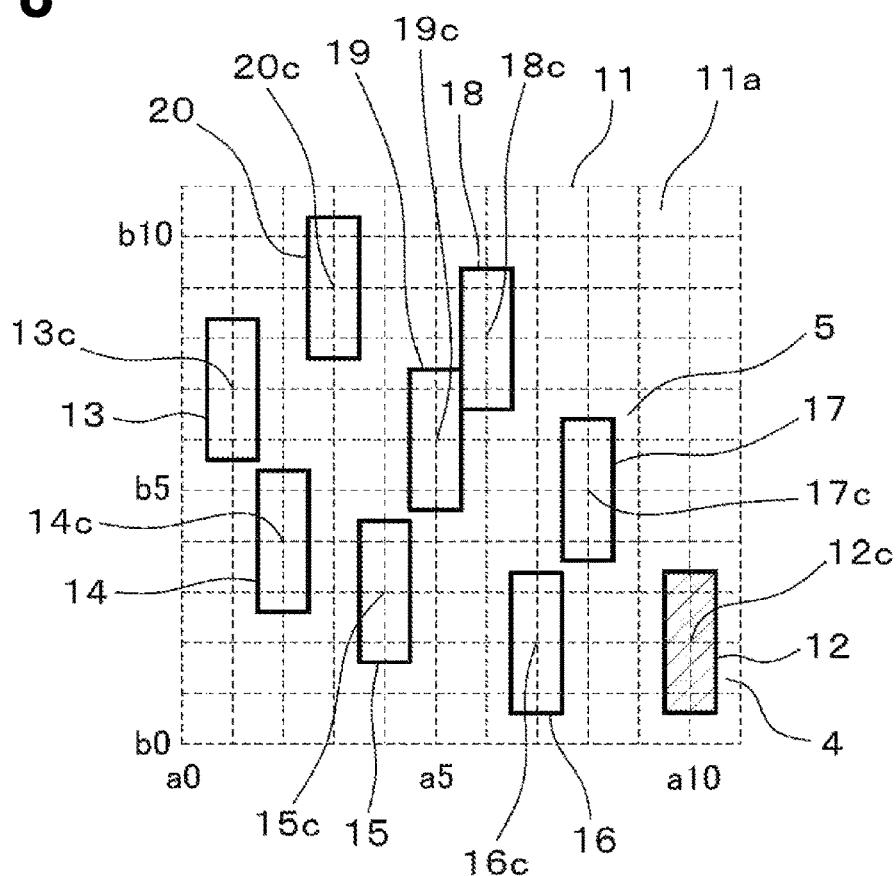
FIG. 8 shows a second embodiment, and is a diagram for explaining an arrangement form of a transmitting antenna and a receiving antenna.
Figure 9:
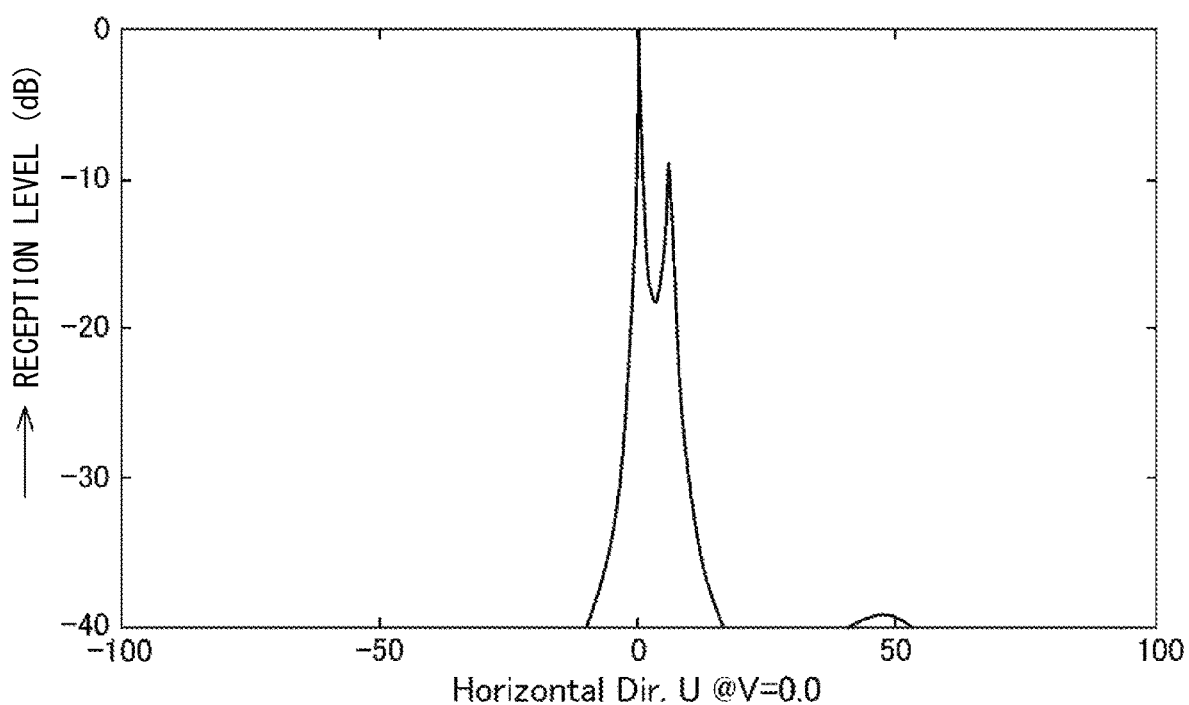
FIG. 9 is a characteristic diagram showing a detection range and a detection level in the horizontal direction of the receiving antenna.
Figure 10:
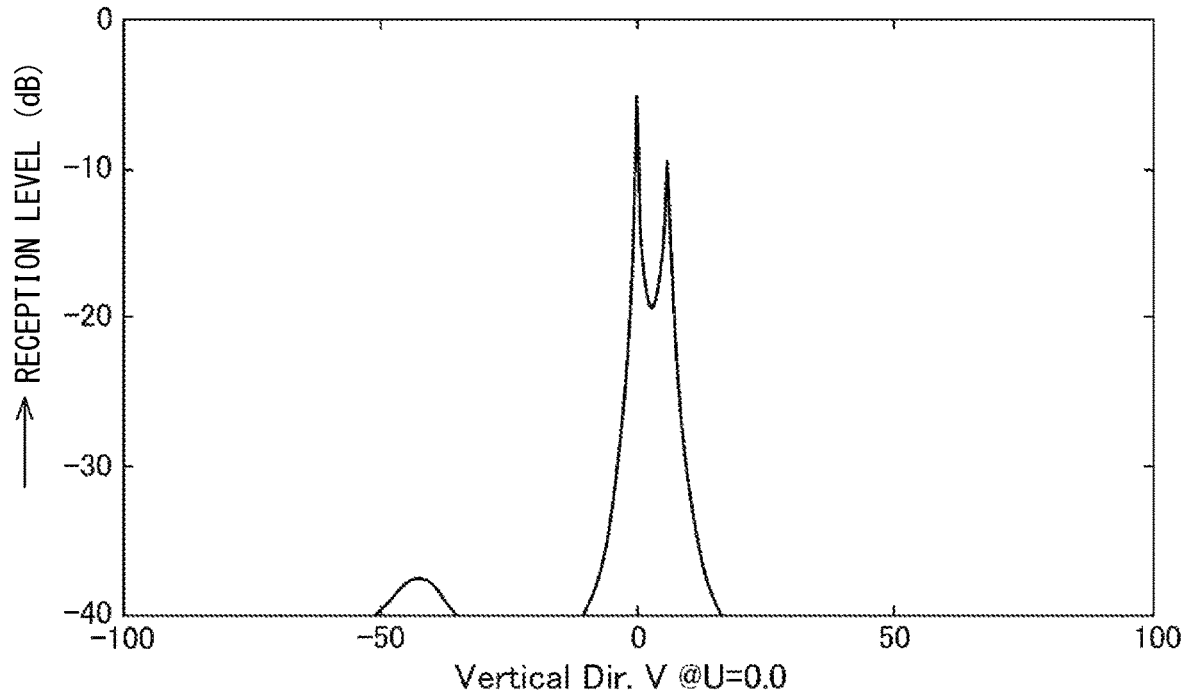
FIG. 10 is a characteristic diagram showing a detection range and a detection level in the vertical direction of the receiving antenna.

FIGS. 8 to 10 show a second embodiment. A configuration identical to that according to the first embodiment is denoted by an identical reference sign. In the second embodiment, as shown in FIG. 8, the arrangement form of the eight element antennas 13 to 20 of the receiving antenna 5 is configured to be close to the pseudo-random arrangement form.

Regarding the eight element antennas 13 to 20, the center 13c of the first element antenna 13 is arranged at the coordinates (a1, b7), and the center 14c of the second element antenna 14 is arranged at the coordinates (a2, b4), the center 15c of the third element antenna 15 is arranged at the coordinates (a4, b3), and the center 16c of the fourth element antenna 16 is arranged at the coordinates (a7, b2). Then, the center 17c of the fifth element antenna 17 is arranged at the coordinates (a8, b5), the center 18c of the sixth element antenna 18 is arranged at the coordinates (a6, b8), and the center 19c of the seventh element antenna 19 is arranged at the coordinates (a5, b6), and the center 20c of the eighth element antenna 20 is arranged at the coordinates (a3, b9).

In the case of the present embodiment, by arranging the eight element antennas 13 to 20 of the receiving antenna 5 as described above, the arrangement form of the eight element antennas 13 to 20 becomes close to the pseudo-random arrangement form. Further, among the eight element antennas 13 to 20, two element antennas adjacent to each other in the vertical direction are arranged so as to face each other with a straight line extending in the left-right direction passing through an intermediate position in the vertical direction, for example, position b5. In other words, the arrangement form of the element antennas 13 to 20 is such that the sign of the coordinates in the vertical direction with respect to the midpoint in the vertical direction, for example, the position b5, changes alternatively. Configurations according to the second embodiment other than those described above are similar to corresponding configurations according to the first embodiment. The second embodiment thus achieves substantially the same functional effect as that according to the first embodiment.

The results of simulating the reception operation of the receiving antenna 5 of the radar device 1 of the present embodiment are shown in FIGS. 9 and 10. The conditions of the simulation are the same as in the case of the first embodiment. FIG. 9 is a characteristic diagram showing a detection range and a detection level in the horizontal direction of the receiving antenna 5 of the present embodiment. FIG. 10 is a characteristic diagram showing a detection range and a detection level in the vertical direction of the receiving antenna 5 of the present embodiment. From FIGS. 9 and 10, it can be confirmed that the receiving antenna 5 of the radar device 1 of the present embodiment has a detection resolution in the vertical direction equivalent to that in the horizontal direction.

Third Embodiment

Figure 11:
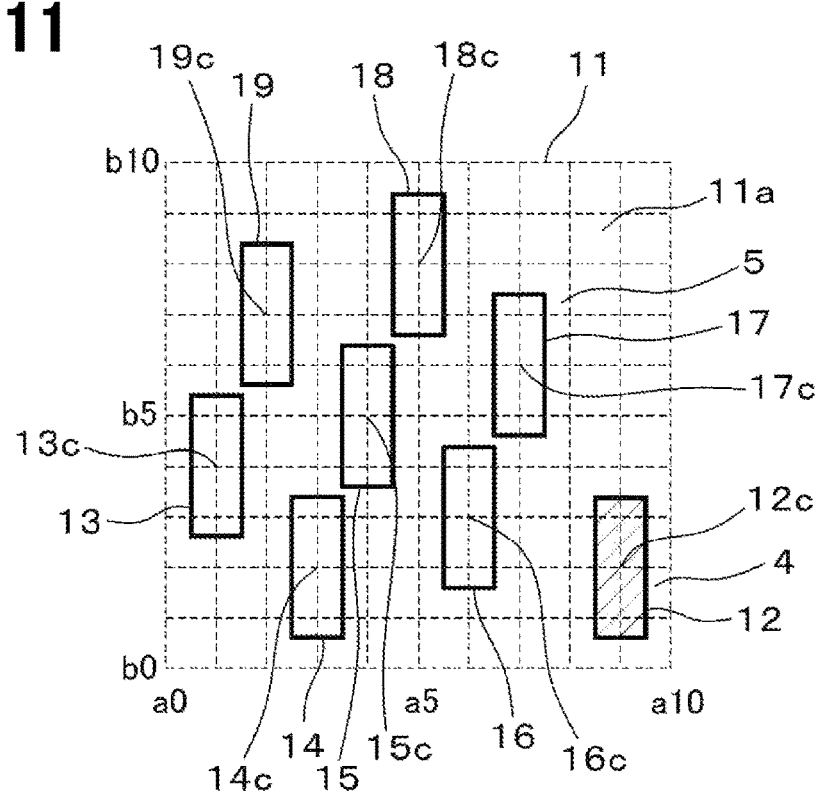
FIG. 11 shows a third embodiment, and is a diagram for explaining an arrangement form of a transmitting antenna and a receiving antenna.
Figure 12:
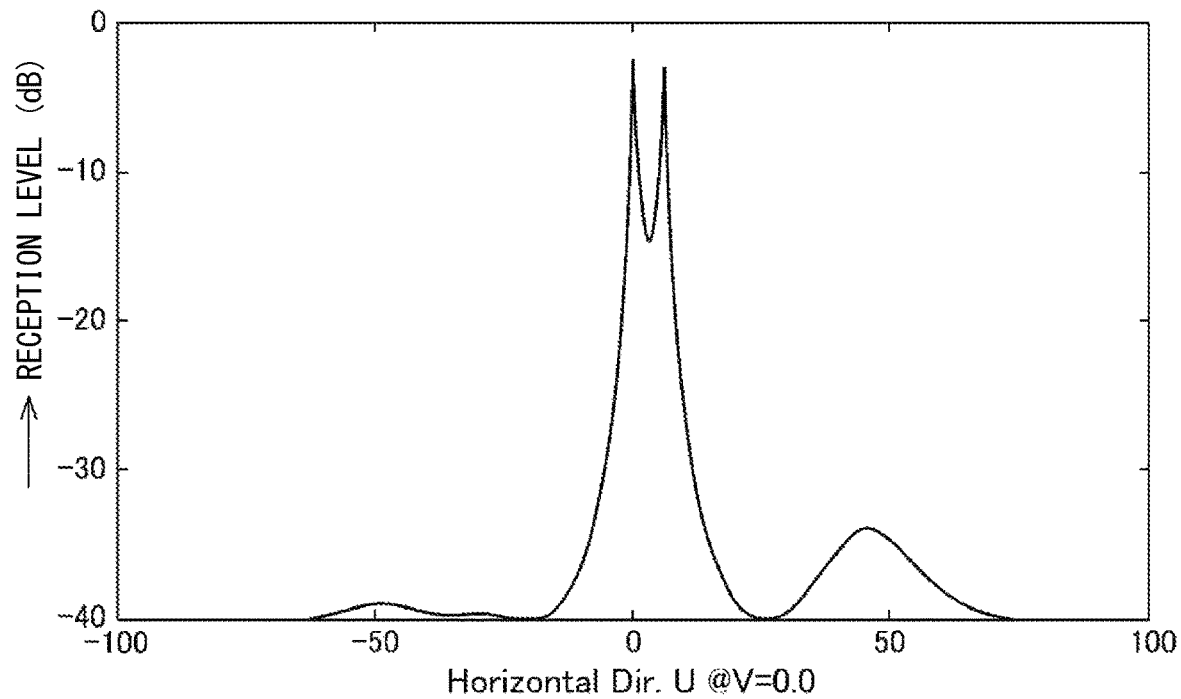
FIG. 12 is a characteristic diagram showing a detection range and a detection level in the horizontal direction of the receiving antenna.
Figure 13:
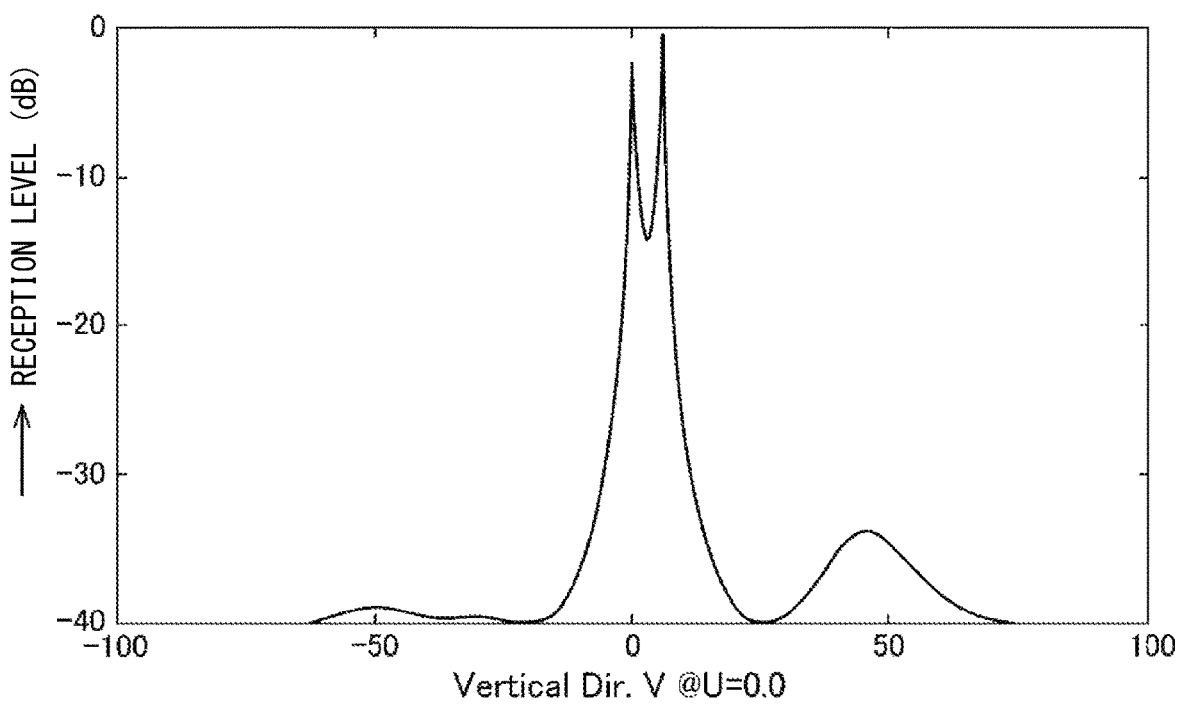
FIG. 13 is a characteristic diagram showing a detection range and a detection level in the vertical direction of the receiving antenna.

FIGS. 11 to 13 show a third embodiment. A configuration identical to that according to the first embodiment is denoted by an identical reference sign. In the third embodiment, as shown in FIG. 11, the arrangement form of the seven element antennas 13 to 19 of the receiving antenna 5 is configured to be close to the arrangement form of a substantially circular shape and its central position.

Regarding the seven element antennas 13 to 19, the center 13c of the first element antenna 13 is arranged at the coordinates (a1, b4), and the center 14c of the second element antenna 14 is arranged at the coordinates (a3, b2), the center 15c of the third element antenna 15 is arranged at the coordinates (a4, b5), and the center 16c of the fourth element antenna 16 is arranged at the coordinates (a6, b3). Then, the center 17c of the fifth element antenna 17 is arranged at the coordinates (a7, b6), the center 18c of the sixth element antenna 18 is arranged at the coordinates (a5, b8), and the center 19c of the seventh element antenna 19 is arranged at the coordinates (a2, b7).

In the case of the present embodiment, by arranging the eight element antennas 13 to 20 of the receiving antenna 5 as described above, the arrangement form of the eight element antennas 13 to 20 becomes close to the arrangement form of a substantially circular shape and its central position.

Configurations according to the third embodiment other than those described above are similar to corresponding configurations according to the first embodiment. The third embodiment thus achieves functional effect substantially same as that according to the first embodiment.

The results of simulating the reception operation of the receiving antenna 5 of the radar device 1 of the present embodiment are shown in FIGS. 12 and 13. The conditions of the simulation are the same as in the case of the first embodiment. FIG. 12 is a characteristic diagram showing a detection range and a detection level in the horizontal direction of the receiving antenna 5 of the present embodiment. FIG. 13 is a characteristic diagram showing a detection range and a detection level in the vertical direction of the receiving antenna 5 of the present embodiment. From FIGS. 12 and 13, it can be confirmed that the receiving antenna 5 of the radar device 1 of the present embodiment has a detection resolution in the vertical direction equivalent to that in the horizontal direction.

Fourth Embodiment

Figure 14:
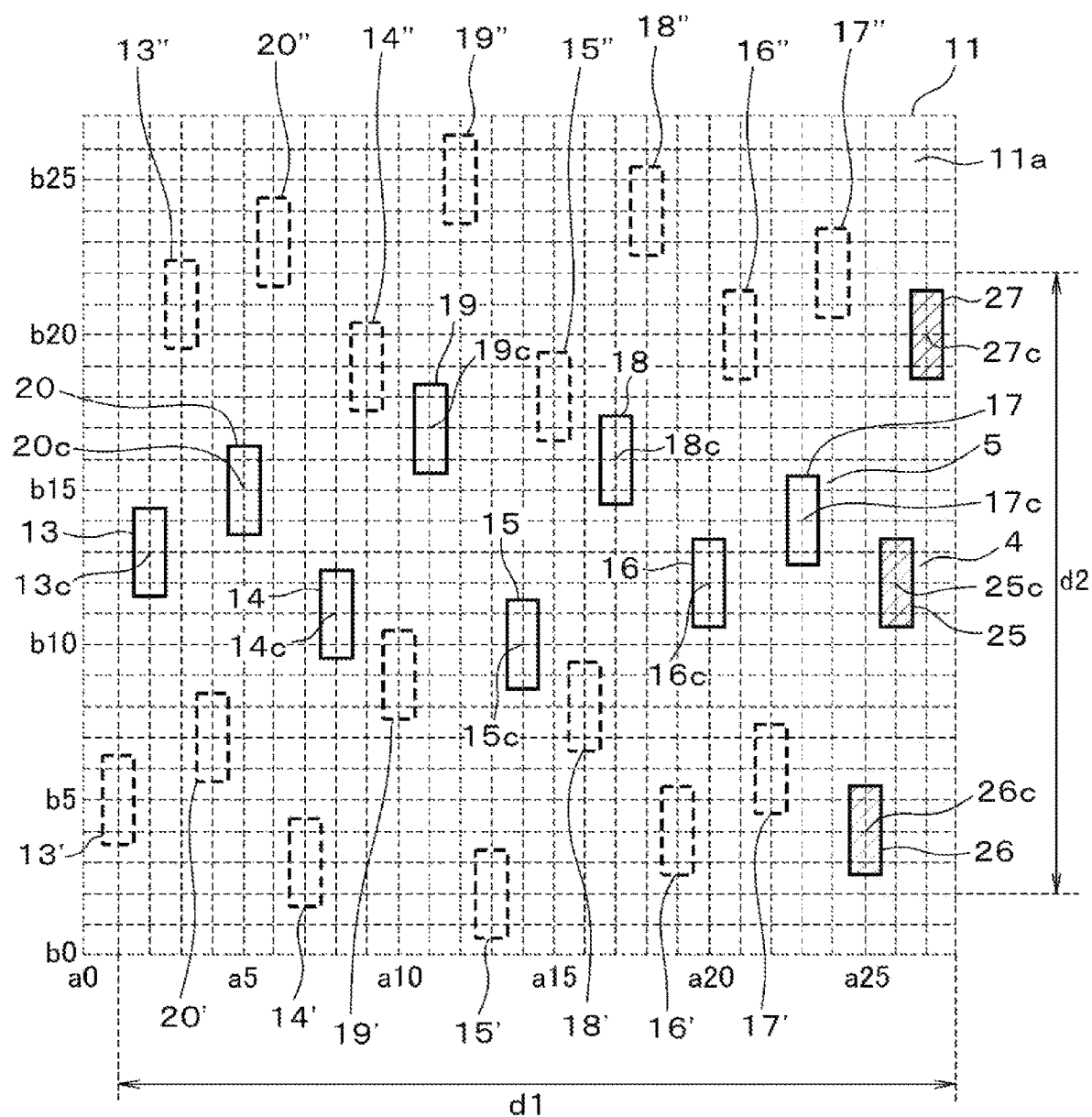
FIG. 14 shows a fourth embodiment, and is a diagram for explaining an arrangement form of a transmitting antenna and a receiving antenna.
Figure 15:
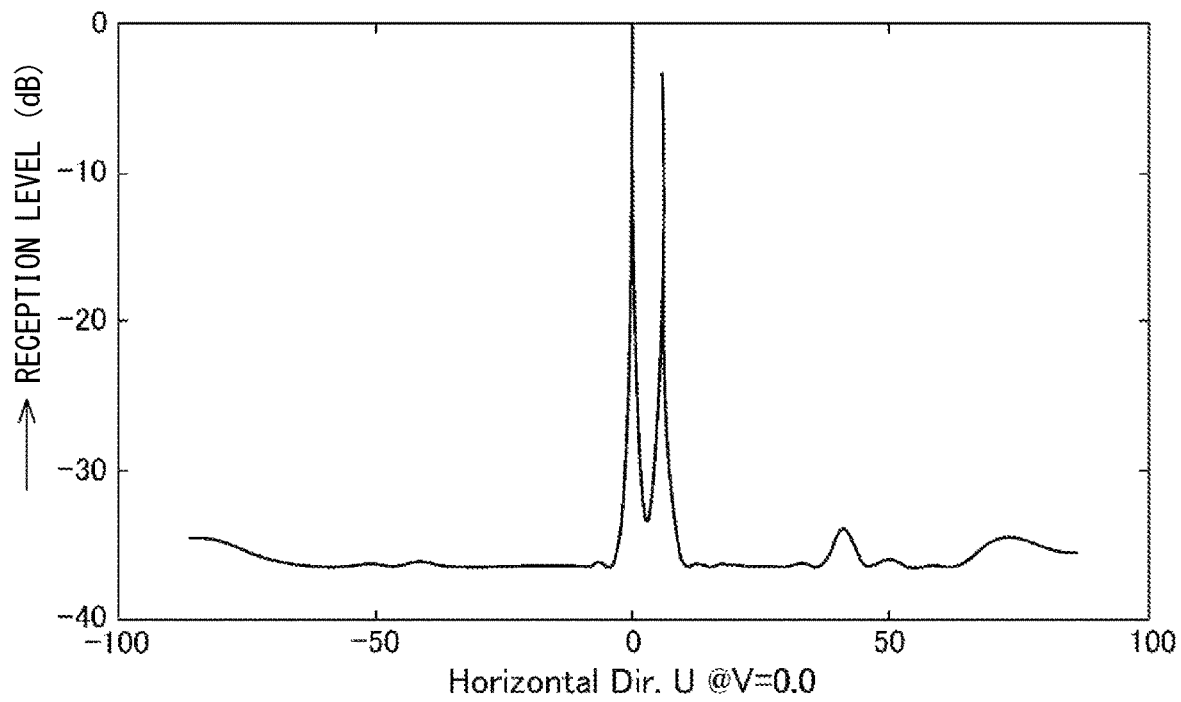
FIG. 15 is a characteristic diagram showing a detection range and a detection level in the horizontal direction of the receiving antenna.
Figure 16:
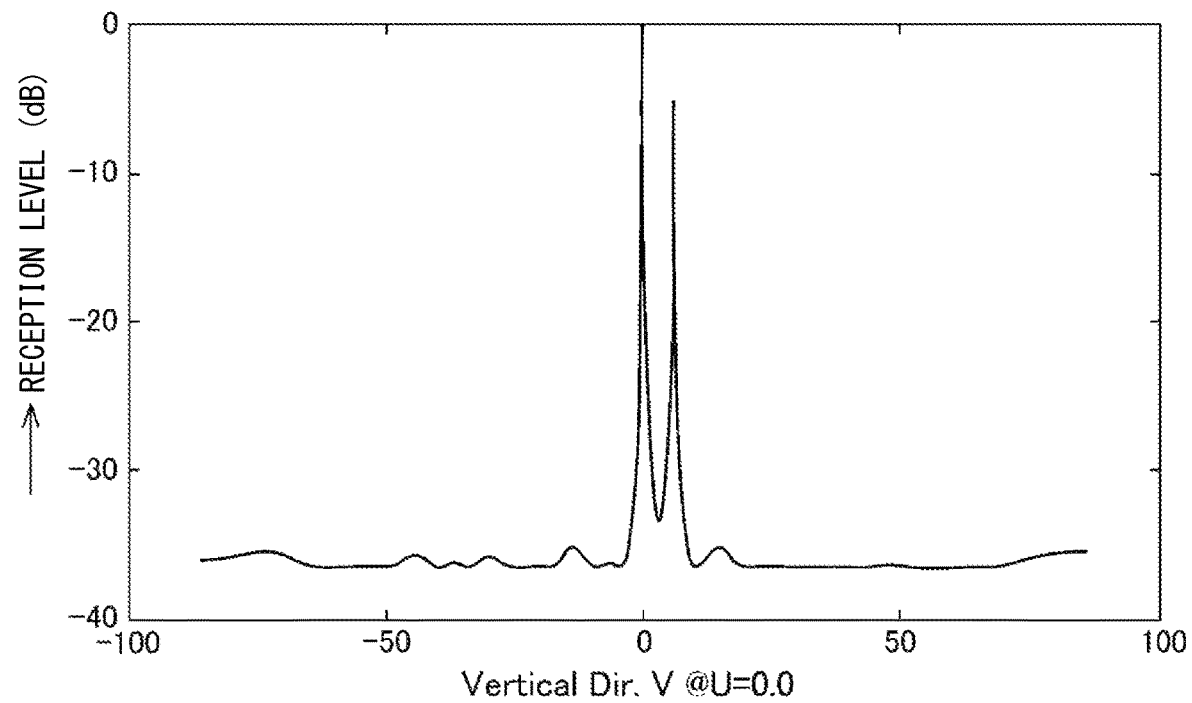
FIG. 16 is a characteristic diagram showing a detection range and a detection level in the vertical direction of the receiving antenna.

FIGS. 14 to 16 show a fourth embodiment. A configuration identical to that according to the first embodiment is denoted by an identical reference sign. In the fourth embodiment, as shown in FIG. 14, the arrangement form of the eight element antennas 13 to 20 of the receiving antenna 5 is configured to be close to the arrangement form of a substantially circular shape, for example, a horizontally long elliptical shape. Further, as the transmitting antenna 4, three element antennas 25, 26, and 27 are provided.

Regarding the eight element antennas 13 to 20, the center 13c of the first element antenna 13 is arranged at the coordinates (a2, b13), and the center 14c of the second element antenna 14 is arranged at the coordinates (a8, b11), the center 15c of the third element antenna 15 is arranged at the coordinates (a14, b010), and the center 16c of the fourth element antenna 16 is arranged at the coordinates (a20, b12). Then, the center 17c of the fifth element antenna 17 is arranged at the coordinates (a23, b14), the center 18c of the sixth element antenna 18 is arranged at the coordinates (a17, b16), and the center 19c of the seventh element antenna 19 is arranged at the coordinates (a11, b17), and the center 20c of the eighth element antenna 20 is arranged at the coordinates (a5, b15).

Further, among the three element antennas 25, 26, and 27 of the transmitting antenna 4, the center 25c of the first element antenna 25 is arranged at the coordinates (a26, b12), and the center 26c of the second element antenna 26 is arranged at the coordinates (a25, b4), and the center 27c of the third element antenna 27 is arranged at the coordinates (a27, b20).

In the case of the above configuration, the eight element antennas 13 to 20 of the receiving antenna 5 receives the radio waves reflected by the target of the radio waves transmitted from the second element antenna 26 of the transmitting antenna 4, so that the function of receiving by the virtual eight element antennas 13' to 20' is realized. Then, the radio waves reflected by the target of the radio waves transmitted from the third element antenna 27 of the transmitting antenna 4 are received by the eight element antennas 13 to 20 of the receiving antenna 5, thereby the function of receiving by the eight virtual element antennas 13" to 20" of the receiving antenna 5 is realized.

That is, in the present embodiment, the receiving antenna 5 actually includes only eight element antennas 13 to 20, but provides the eight virtual element antennas 13' to 20' and the eight virtual element antennas 13 "to 20". In the case of this configuration, as the antenna substrate 11, in FIG. 14, a substrate in a region surrounded by the horizontal dimension of d1 and the vertical dimension of d2 is prepared, and eight actual bodies of the element antennas 13 to 20 of the receiving antenna 5 and the three element antennas 25, 26, 27 of the transmitting antenna 4 are arranged on the substrate.

In the present embodiment, by arranging the eight element antennas 13 to 20 of the receiving antenna 5 as described above, the arrangement form of the eight element antennas 13 to 20 is approximately circular, for example, horizontally elongated elliptical arrangement in the horizontal direction. Further, in the present embodiment, the number of element antennas 25 to 27 of the transmitting antenna 4 is defined as N, and the number of element antennas 13 to 20 of the receiving antenna 5 is defined as M. The horizontal spacing of M element antennas 13 to 20 of the receiving antenna 5 is approximately N/2 times the wavelength λ, and the vertical spacing of the M element antennas 13 to 20 of the receiving antenna 5 is approximately ½ times the wavelength λ. Then, the horizontal distance between the N element antennas 25 to 27 of the transmitting antenna 4 is approximately ½ times the wavelength λ, and the vertical distance of the N element antennas 25 to 27 of the transmitting antenna 4 is approximately M/2 times the wavelength λ.

Explaining this configuration in another expression, the distance between the M element antennas of the receiving antenna in the first direction is N times the first set interval d1, and the distance between the M element antennas of the receiving antenna in the second direction is the second set interval d2. The distance between the N element antennas of the transmitting antenna in the first direction is the first set interval d1, and the distance between the N element antennas of the transmitting antenna in the second direction is M times the second set interval d2.

Configurations according to the fourth embodiment other than those described above are similar to corresponding configurations according to the first embodiment. The fourth embodiment thus achieves substantially the same functional effect as that according to the first embodiment.

The results of simulating the reception operation of the receiving antenna 5 of the radar device 1 of the present embodiment are shown in FIGS. 15 and 16. The conditions of the simulation are the same as in the case of the first embodiment. FIG. 15 is a characteristic diagram showing a detection range and a detection level in the horizontal direction of the receiving antenna 5 of the present embodiment. FIG. 16 is a characteristic diagram showing a detection range and a detection level in the vertical direction of the receiving antenna 5 of the present embodiment. From FIGS. 15 and 16, it can be confirmed that the receiving antenna 5 of the radar device 1 of the present embodiment has a detection resolution in the vertical direction equivalent to that in the horizontal direction.

Fifth Embodiment

Figure 17:
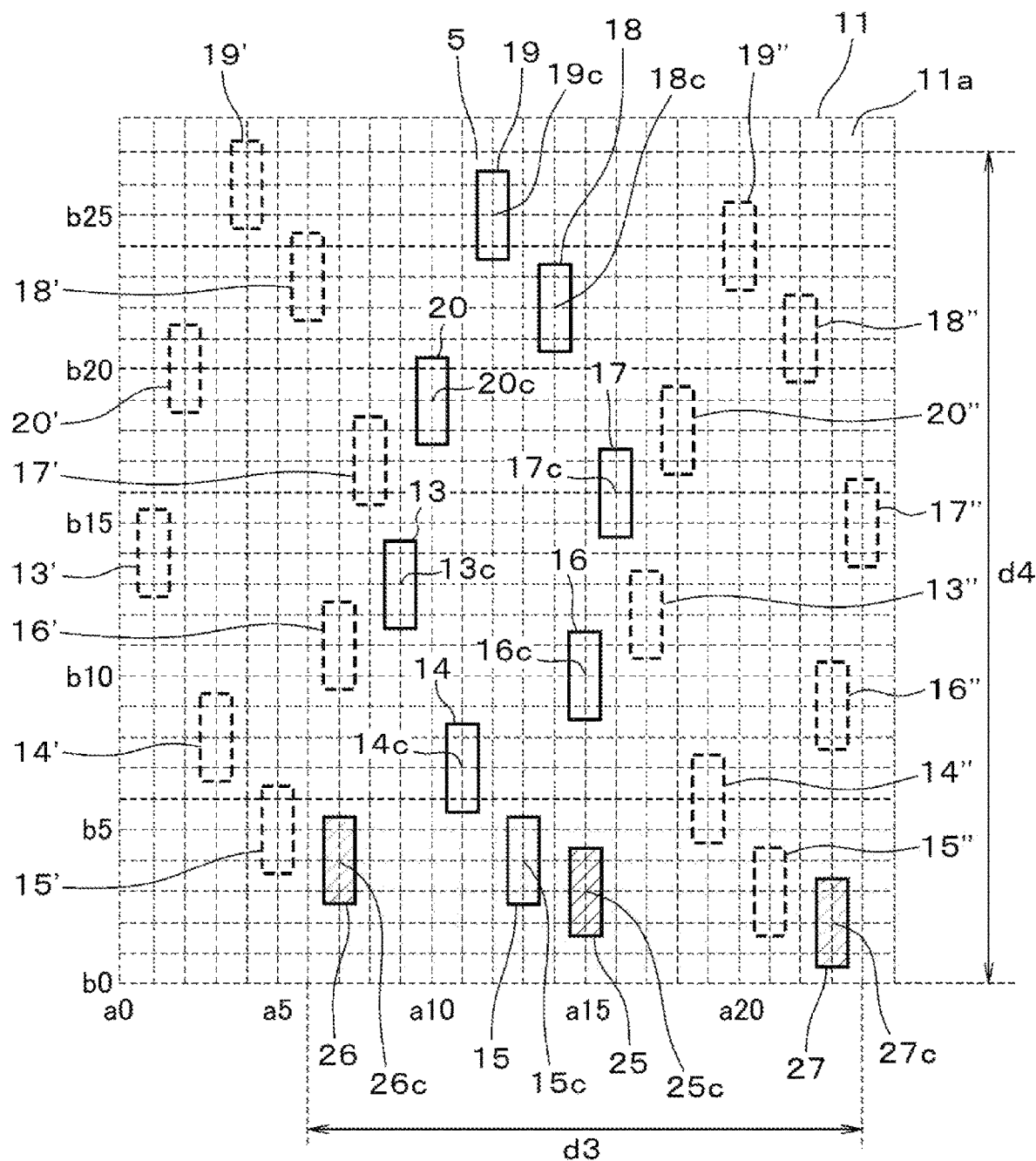
FIG. 17 shows a fifth embodiment, and is a diagram for explaining an arrangement form of a transmitting antenna and a receiving antenna.
Figure 18:
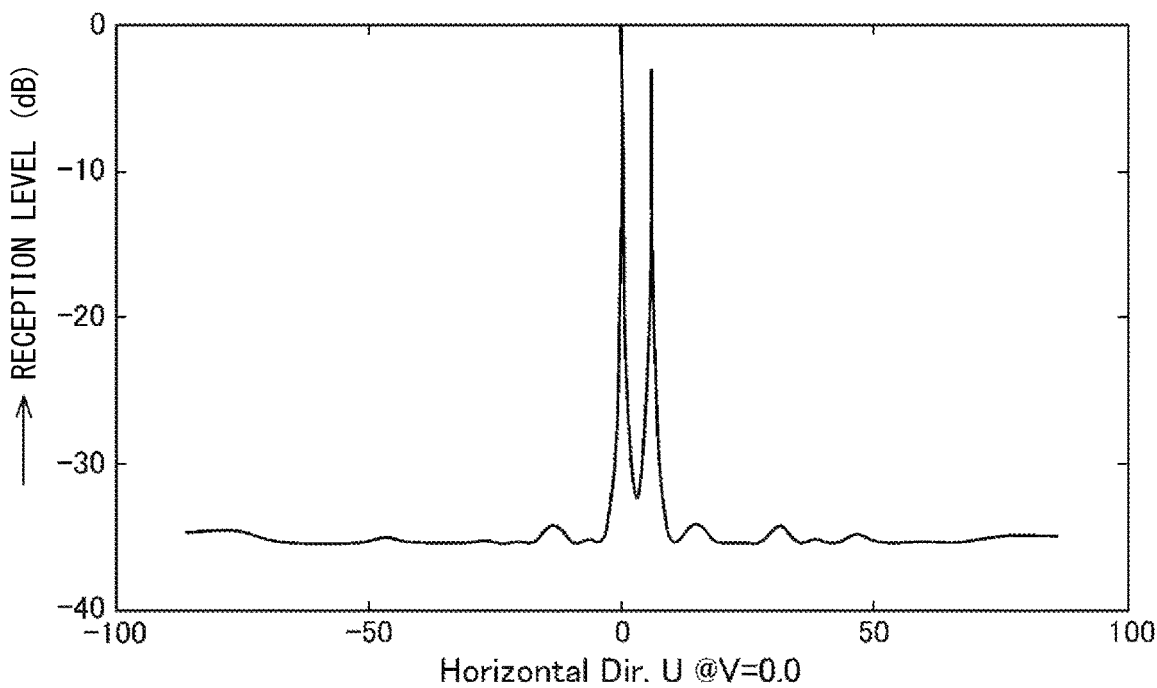
FIG. 18 is a characteristic diagram showing a detection range and a detection level in the horizontal direction of the receiving antenna.
Figure 19:
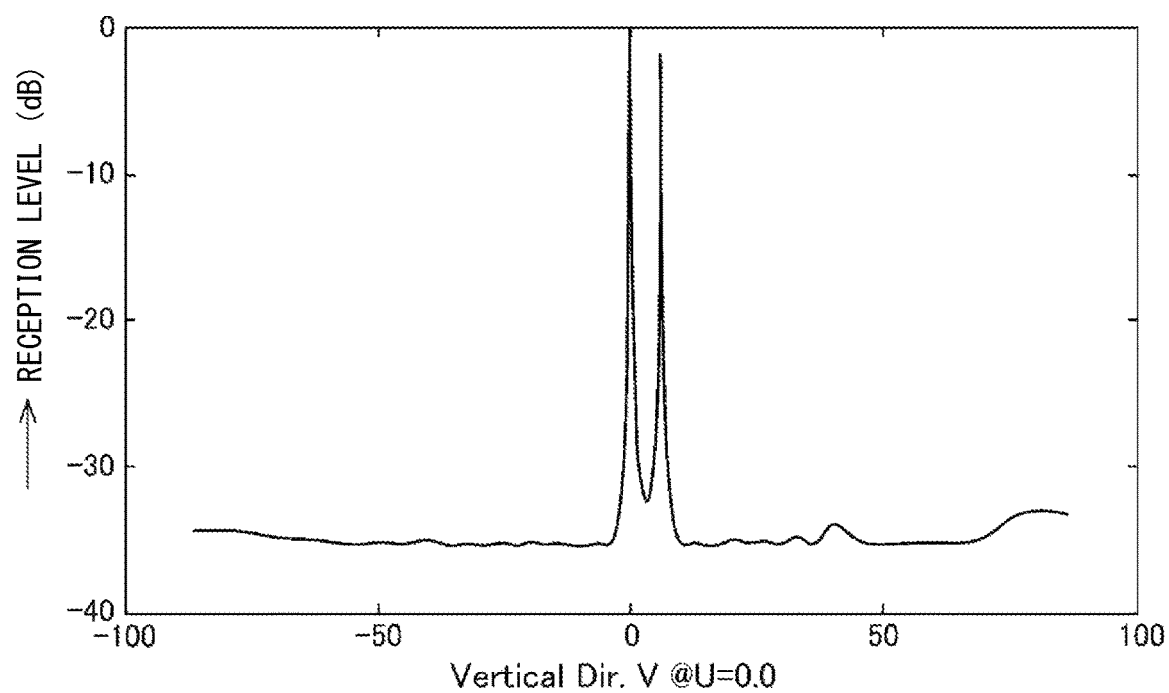
FIG. 19 is a characteristic diagram showing a detection range and a detection level in the vertical direction of the receiving antenna.

FIGS. 17 to 19 show a fourth embodiment. A configuration identical to that according to the fourth embodiment is denoted by an identical reference sign. In the third embodiment, as shown in FIG. 11, the arrangement form of the eight element antennas 13 to 20 of the receiving antenna 5 is configured to be close to the arrangement form of a substantially circular shape, for example, a vertically long elliptical shape.

Regarding the eight element antennas 13 to 20, the center 13c of the first element antenna 13 is arranged at the coordinates (a9, b2), and the center 14c of the second element antenna 14 is arranged at the coordinates (a11, b7), the center 15c of the third element antenna 15 is arranged at the coordinates (a13, b4), and the center 16c of the fourth element antenna 16 is arranged at the coordinates (a15, b10). Then, the center 17c of the fifth element antenna 17 is arranged at the coordinates (a16, b16), the center 18c of the sixth element antenna 18 is arranged at the coordinates (a14, b22), and the center 19c of the seventh element antenna 19 is arranged at the coordinates (a12, b25), and the center 19c of the eighth element antenna 20 is arranged at the coordinates (a10, b19).

Further, among the three element antennas 25, 26, and 27 of the transmitting antenna 4, the center 25c of the first element antenna 25 is arranged at the coordinates (a15, b3), and the center 26c of the second element antenna 26 is arranged at the coordinates (a7, b4), and the center 27c of the third element antenna 27 is arranged at the coordinates (a23, b2).

In the case of the above configuration, the eight element antennas 13 to 20 of the receiving antenna 5 receives the radio waves reflected by the target of the radio waves transmitted from the second element antenna 26 of the transmitting antenna 4, so that the function of receiving by the virtual eight element antennas 13' to 20' is realized. Then, the radio waves reflected by the target of the radio waves transmitted from the third element antenna 27 of the transmitting antenna 4 are received by the eight element antennas 13 to 20 of the receiving antenna 5, thereby the function of receiving by the eight virtual element antennas 13" to 20" of the receiving antenna 5 is realized.

That is, in the present embodiment, the receiving antenna 5 actually includes only eight element antennas 13 to 20, but provides the eight virtual element antennas 13' to 20' and the eight virtual element antennas 13 "to 20". In the case of this configuration, as the antenna substrate 11, in FIG. 17, a substrate in a region surrounded by the horizontal dimension of d3 and the vertical dimension of d4 is prepared, and eight actual bodies of the element antennas 13 to 20 of the receiving antenna 5 and the three element antennas 25, 26, 27 of the transmitting antenna 4 are arranged on the substrate.

In the present embodiment, by arranging the eight element antennas 13 to 20 of the receiving antenna 5 as described above, the arrangement form of the eight element antennas 13 to 20 is approximately circular, for example, vertically elongated elliptical arrangement in the vertical direction. Further, in the present embodiment, the number of element antennas 25 to 27 of the transmitting antenna 4 is defined as N, and the number of element antennas 13 to 20 of the receiving antenna 5 is defined as M. The horizontal spacing of M element antennas 13 to 20 of the receiving antenna 5 is approximately ½ times the wavelength λ, and the vertical spacing of the M element antennas 13 to 20 of the receiving antenna 5 is approximately N/2 times the wavelength λ. Then, the horizontal distance between the N element antennas 25 to 27 of the transmitting antenna 4 is approximately M/2 times the wavelength λ, and the vertical distance of the N element antennas 25 to 27 of the transmitting antenna 4 is approximately ½ times the wavelength λ.

Explaining this configuration in another expression, the distance between the M element antennas of the receiving antenna in the first direction is the first set interval d1, and the distance between the M element antennas of the receiving antenna in the second direction is N times the second set interval d2. The distance between the N element antennas of the transmitting antenna in the first direction is M times the first set interval d1, and the distance between the N element antennas of the transmitting antenna in the second direction is the second set interval d2.

Configurations according to the fifth embodiment other than those described above are similar to corresponding configurations according to the fourth embodiment. The fifth embodiment thus achieves substantially the same functional effect as that according to the fourth embodiment.

The results of simulating the reception operation of the receiving antenna 5 of the radar device 1 of the present embodiment are shown in FIGS. 18 and 19. The conditions of the simulation are the same as in the case of the first embodiment. FIG. 18 is a characteristic diagram showing a detection range and a detection level in the horizontal direction of the receiving antenna 5 of the present embodiment. FIG. 19 is a characteristic diagram showing a detection range and a detection level in the vertical direction of the receiving antenna 5 of the present embodiment. From FIGS. 18 and 19, it can be confirmed that the receiving antenna 5 of the radar device 1 of the present embodiment has a detection resolution in the vertical direction equivalent to that in the horizontal direction.

Sixth Embodiment

Figure 20:
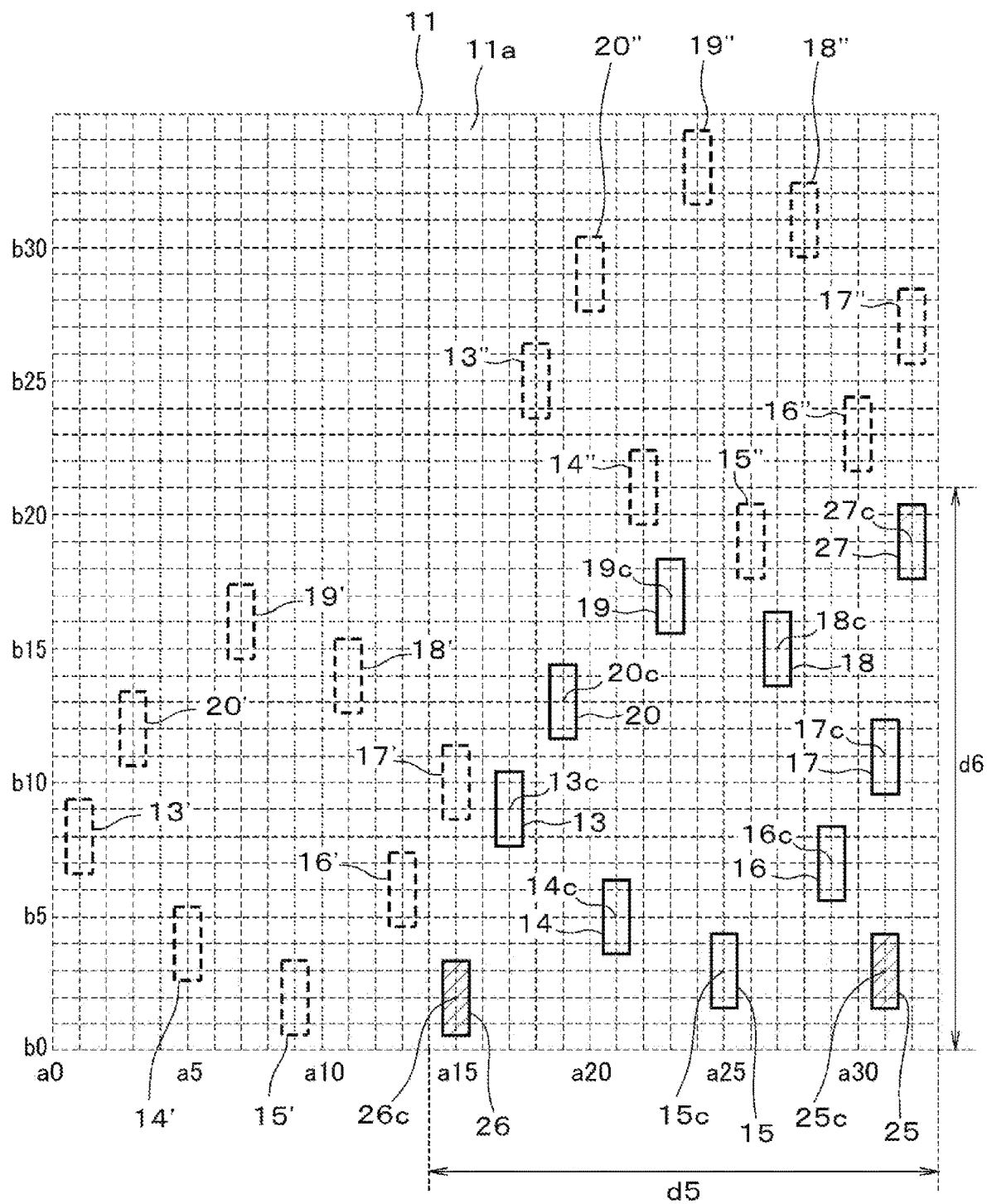
FIG. 20 shows a sixth embodiment, and is a diagram for explaining an arrangement form of a transmitting antenna and a receiving antenna.
Figure 21:
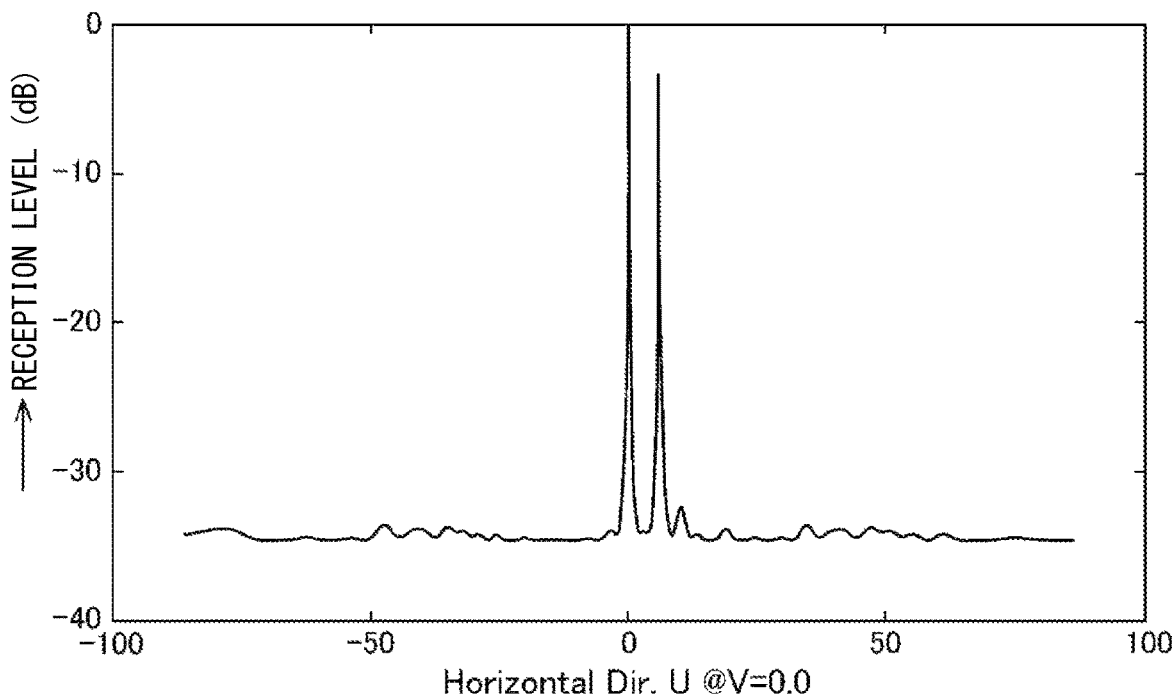
FIG. 21 is a characteristic diagram showing a detection range and a detection level in the horizontal direction of the receiving antenna.
Figure 22:
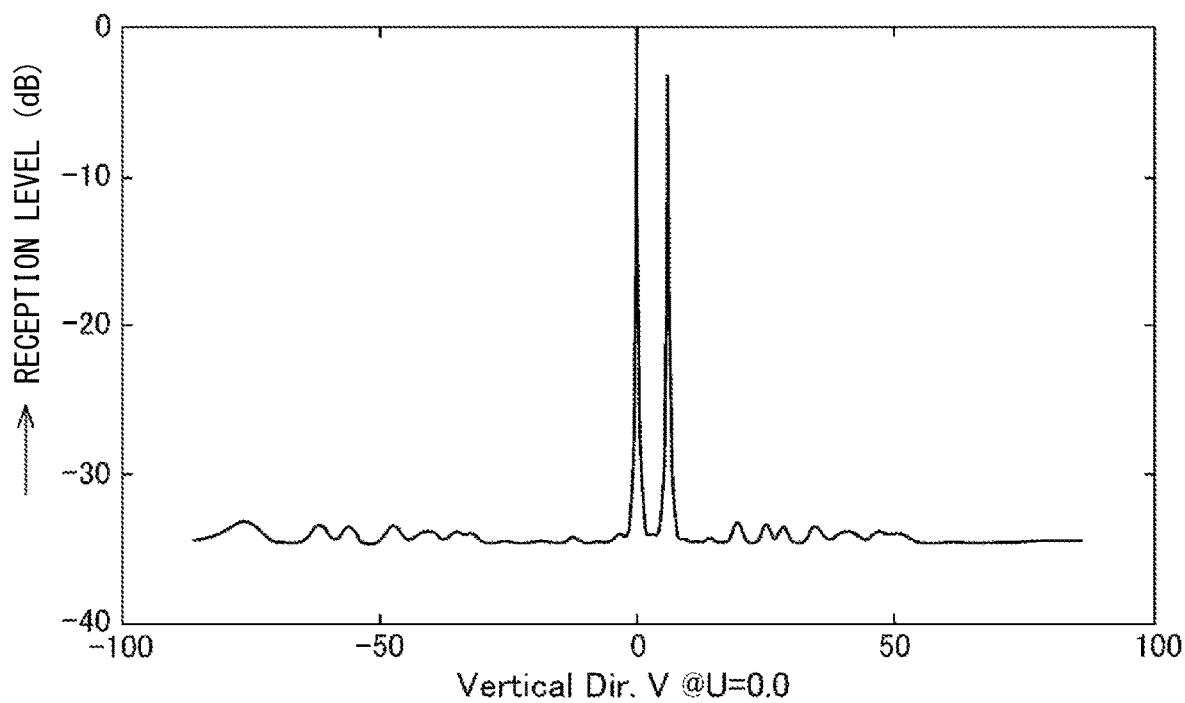
FIG. 22 is a characteristic diagram showing a detection range and a detection level in the vertical direction of the receiving antenna.

FIGS. 20 to 22 show a fourth embodiment. A configuration identical to that according to the first embodiment is denoted by an identical reference sign. In the sixth embodiment, as shown in FIG. 20, the arrangement form of the eight element antennas 13 to 20 of the receiving antenna 5 is configured to be close to a circular arrangement form. Further, as the transmitting antenna 4, three element antennas 25, 26, and 27 are provided.

Regarding the eight element antennas 13 to 20 of the receiving antenna 5, the center 13c of the first element antenna 13 is arranged at the coordinates (a17, b9), and the center 14c of the second element antenna 14 is arranged at the coordinates (a21, b5), the center 15c of the third element antenna 15 is arranged at the coordinates (a25, b3), and the center 16c of the fourth element antenna 16 is arranged at the coordinates (a29, b7). Then, the center 17c of the fifth element antenna 17 is arranged at the coordinates (a31, b11), the center 18c of the sixth element antenna 18 is arranged at the coordinates (a27, b15), and the center 19c of the seventh element antenna 19 is arranged at the coordinates (a23, b17), and the center 20c of the eighth element antenna 20 is arranged at the coordinates (a19, b13).

Further, among the three element antennas 25, 26, and 27 of the transmitting antenna 4, the center 25c of the first element antenna 25 is arranged at the coordinates (a31, b3), and the center 26c of the second element antenna 26 is arranged at the coordinates (a15, b2), and the center 27c of the third element antenna 27 is arranged at the coordinates (a32, b19).

In the case of the above configuration, the eight element antennas 13 to 20 of the receiving antenna 5 receives the radio waves reflected by the target of the radio waves transmitted from the second element antenna 26 of the transmitting antenna 4, so that the function of receiving by the virtual eight element antennas 13' to 20' is realized. Then, the radio waves reflected by the target of the radio waves transmitted from the third element antenna 27 of the transmitting antenna 4 are received by the eight element antennas 13 to 20 of the receiving antenna 5, thereby the function of receiving by the eight virtual element antennas 13" to 20" of the receiving antenna 5 is realized.

That is, in the present embodiment, the receiving antenna 5 actually includes only eight element antennas 13 to 20, but provides the eight virtual element antennas 13' to 20' and the eight virtual element antennas 13 "to 20". In the case of this configuration, as the antenna substrate 11, in FIG. 20, a substrate in a region surrounded by the horizontal dimension of d5 and the vertical dimension of d6 is prepared, and eight actual bodies of the element antennas 13 to 20 of the receiving antenna 5 and the three element antennas 25, 26, 27 of the transmitting antenna 4 are arranged on the substrate.

In the case of the present embodiment, by arranging the eight element antennas 13 to 20 of the receiving antenna 5 as described above, the arrangement form of the eight element antennas 13 to 20 becomes close to the circular arrangement form. Further, in the receiving antenna 5, the actual eight element antennas 13 to 20, the eight virtual element antennas 13' to 20', and the eight virtual element antennas 13" to 20" are approximately arranged in a L character shape.

Further, in the present embodiment, the number of element antennas 25 to 27 of the transmitting antenna 4 is 3 or more, and the number of element antennas 13 to 20 of the receiving antenna 5 is defined as M. The first element antenna 25 of the transmitting antenna 4 is defined as a reference antenna. The second element antenna 26 is configured such that the interval in the horizontal direction of the second element antenna 26 is approximately equal to ½ of the wavelength λ, and the interval in the vertical direction is approximately M/2 times the wavelength λ. The third element antenna 27 is configured such that the interval in the horizontal direction of the third element antenna 27 is approximately M/2 times the wavelength λ, and the interval in the vertical direction is approximately equal to ½ of the wavelength λ. Then, the horizontal spacing of the M element antennas 13 to 20 of the receiving antenna 5 is approximately equal to ½ of the wavelength λ, and the vertical spacing of the M element antennas 13 to 20 of the receiving antenna 5 is approximately equal to ½ of the wavelength λ.

Explaining this configuration in another expression, the first element antenna of the transmitting antenna is defined as a reference. The second element antenna is arranged such that the interval of the second element antenna in the first direction becomes equivalent to the first set interval d1, and the interval in the second direction is M times the second set interval d2. The third element antenna is arranged such that the interval of the third element antenna in the first direction is M times the first set interval d1, and the interval in the second direction becomes equivalent to the second set interval d2. The interval between the M element antennas of the receiving antenna in the first direction is twice the first set interval d1, and the interval between the M element antennas of the receiving antenna in the second direction is twice the second set interval d2.

Configurations according to the sixth embodiment other than those described above are similar to corresponding configurations according to the first embodiment. The sixth embodiment thus achieves substantially the same functional effect as that according to the first embodiment.

The results of simulating the reception operation of the receiving antenna 5 of the radar device 1 of the present embodiment are shown in FIGS. 21 and 22. The conditions of the simulation are the same as in the case of the first embodiment. FIG. 21 is a characteristic diagram showing a detection range and a detection level in the horizontal direction of the receiving antenna 5 of the present embodiment. FIG. 22 is a characteristic diagram showing a detection range and a detection level in the vertical direction of the receiving antenna 5 of the present embodiment. From FIGS. 21 and 22, it can be confirmed that the receiving antenna 5 of the radar device 1 of the present embodiment has a detection resolution in the vertical direction equivalent to that in the horizontal direction. Further, it can be seen that the receiving antenna 5 in which the element antennas are arranged in an L shape can have a high detection resolution, that is, a high resolution.

Seventh Embodiment

Figure 23:
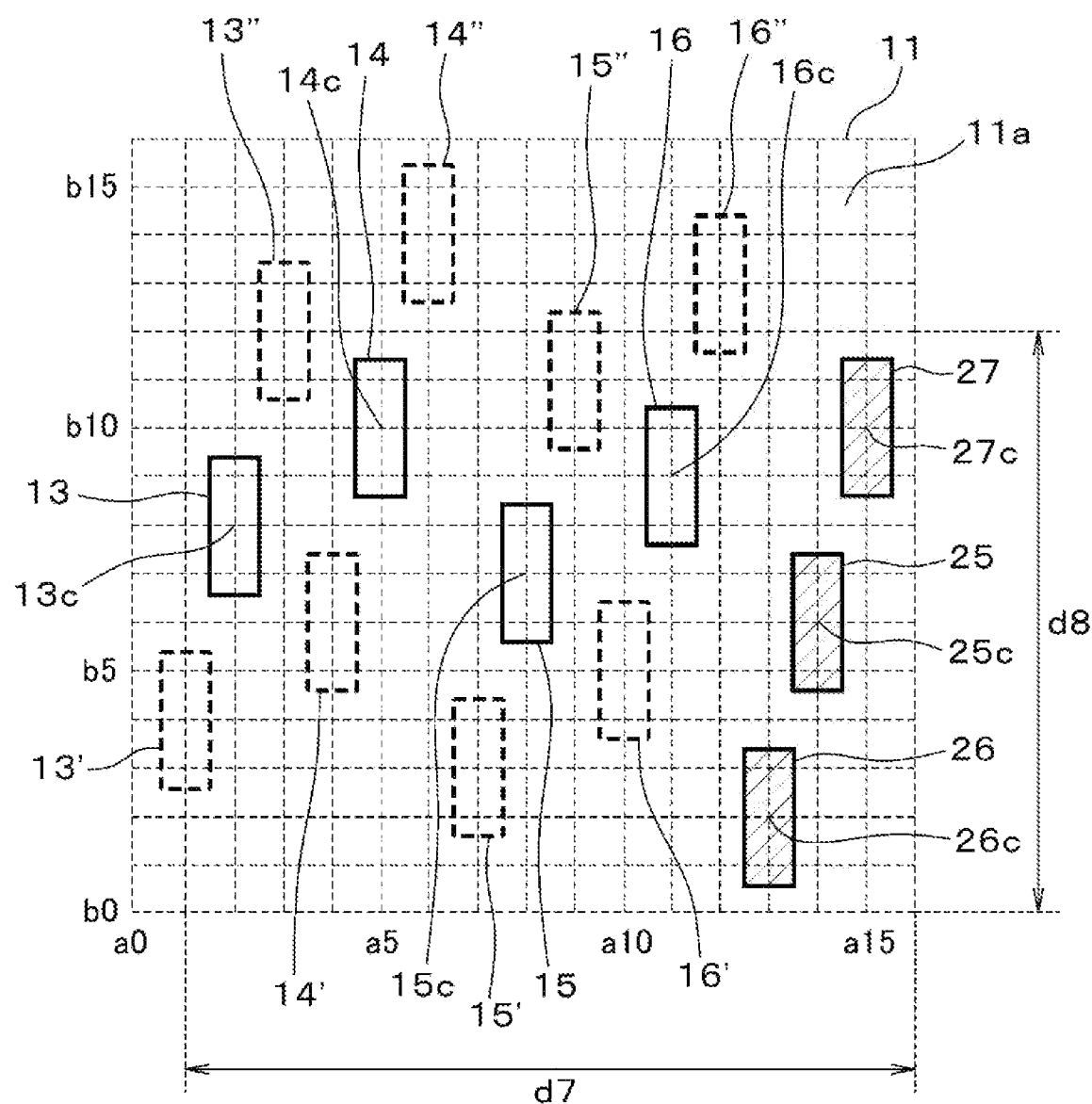
FIG. 23 shows a seventh embodiment, and is a diagram for explaining an arrangement form of a transmitting antenna and a receiving antenna.
Figure 24:
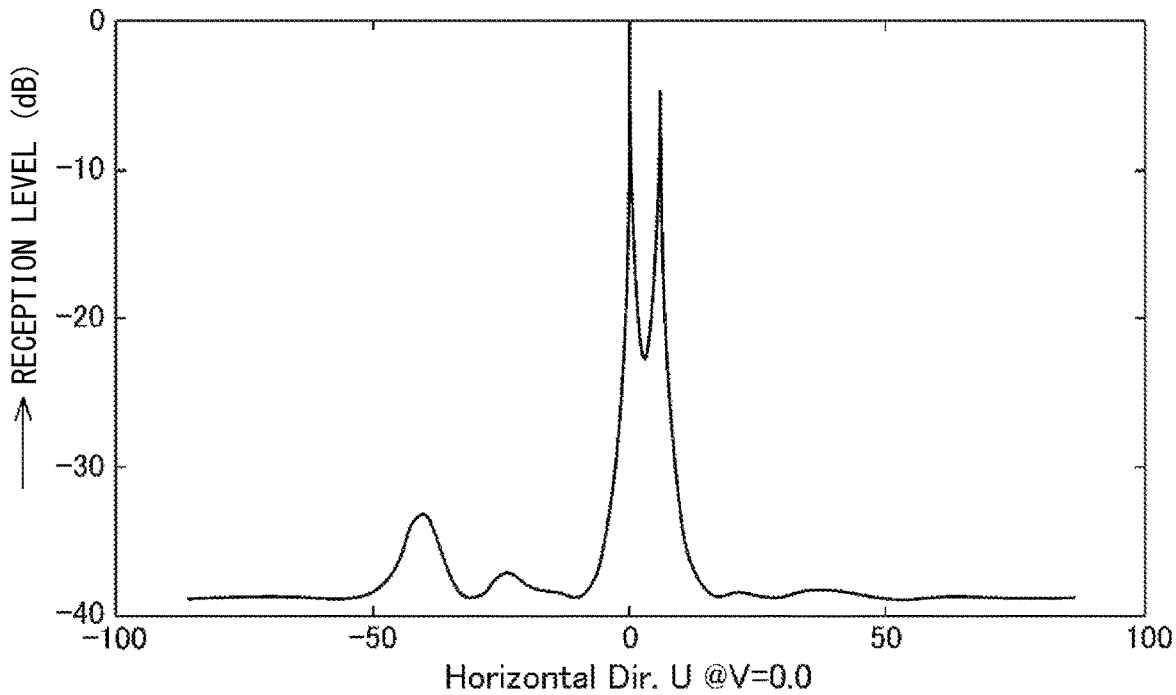
FIG. 24 is a characteristic diagram showing a detection range and a detection level in the horizontal direction of the receiving antenna.
Figure 25:
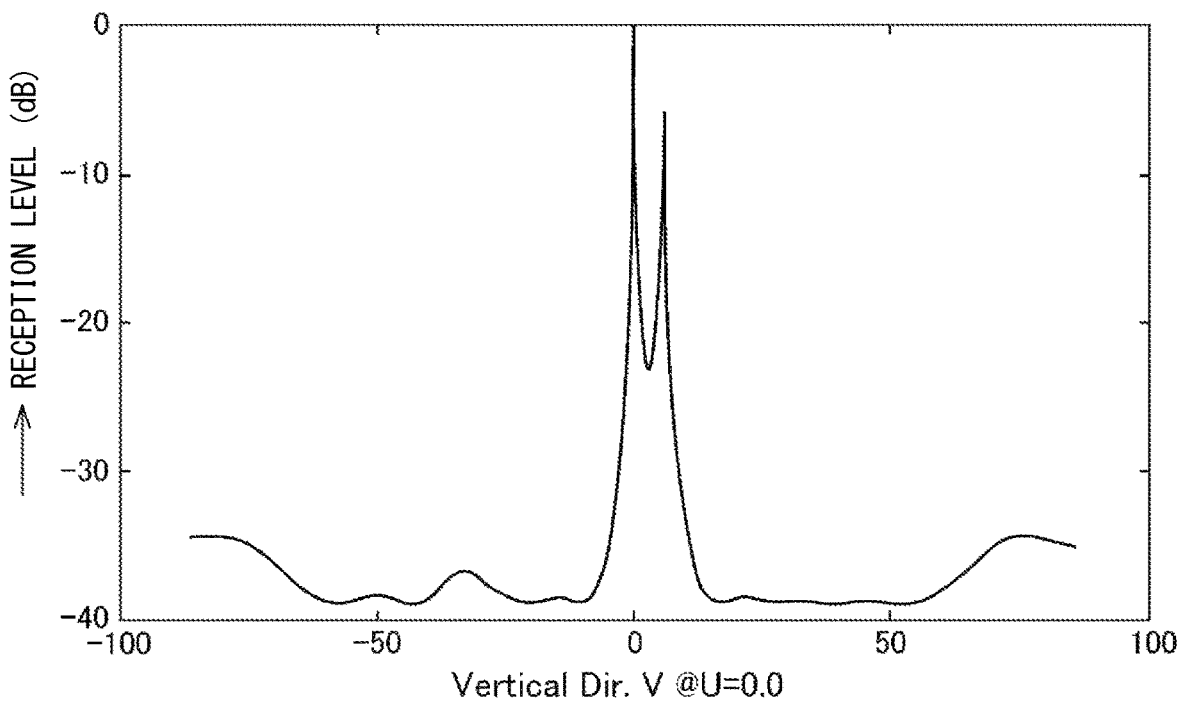
FIG. 25 is a characteristic diagram showing a detection range and a detection level in the vertical direction of the receiving antenna.

FIGS. 23 to 25 show a seventh embodiment. A configuration identical to that according to the first embodiment is denoted by an identical reference sign. In the seventh embodiment, as shown in FIG. 23, the arrangement of the four element antennas 13 to 16 of the receiving antenna 5 is configured to be a so-called zigzag, that is, a staggered arrangement.

Regarding the four element antennas 13 to 16, the center 13c of the first element antenna 13 is arranged at the coordinates (a2, b8), and the center 14c of the second element antenna 14 is arranged at the coordinates (a5, b10), the center 15c of the third element antenna 15 is arranged at the coordinates (a8, b7), and the center 16c of the fourth element antenna 16 is arranged at the coordinates (a11, b9).

Further, among the three element antennas 25, 26, and 27 of the transmitting antenna 4, the center 25c of the first element antenna 25 is arranged at the coordinates (a14, b6), and the center 26c of the second element antenna 26 is arranged at the coordinates (a13, b2), and the center 27c of the third element antenna 27 is arranged at the coordinates (a15, b10).

In the case of the above configuration, the four element antennas 13 to 16 of the receiving antenna 5 receives the radio waves reflected by the target of the radio waves transmitted from the second element antenna 26 of the transmitting antenna 4, so that the function of receiving by the virtual four element antennas 13' to 16' is realized. Then, the radio waves reflected by the target of the radio waves transmitted from the third element antenna 27 of the transmitting antenna 4 are received by the four element antennas 13 to 16 of the receiving antenna 5, thereby the function of receiving by the four virtual element antennas 13" to 16" of the receiving antenna 5 is realized.

That is, in the present embodiment, the receiving antenna 5 actually includes only four element antennas 13 to 16, but provides the four virtual element antennas 13' to 16' and the four virtual element antennas 13" to 16". In the case of this configuration, as the antenna substrate 11, in FIG. 23, a substrate in a region surrounded by the horizontal dimension of d7 and the vertical dimension of d8 is prepared, and four actual bodies of the element antennas 13 to 16 of the receiving antenna 5 and the three element antennas 25, 26, 27 of the transmitting antenna 4 are arranged on the substrate.

Configurations according to the seventh embodiment other than those described above are similar to corresponding configurations according to the first embodiment. The seventh embodiment thus achieves substantially the same functional effect as that according to the first embodiment.

The results of simulating the reception operation of the receiving antenna 5 of the radar device 1 of the present embodiment are shown in FIGS. 24 and 25. The conditions of the simulation are the same as in the case of the first embodiment. FIG. 24 is a characteristic diagram showing a detection range and a detection level in the horizontal direction of the receiving antenna 5 of the present embodiment. FIG. 25 is a characteristic diagram showing a detection range and a detection level in the vertical direction of the receiving antenna 5 of the present embodiment. From FIGS. 24 and 25, it can be confirmed that the receiving antenna 5 of the radar device 1 of the present embodiment has a detection resolution in the vertical direction equivalent to that in the horizontal direction.

Although the present disclosure has been described in accordance with the embodiments, it is understood that the present disclosure is not limited to such embodiments or structures. The present disclosure also includes various modifications and modifications within an equivalent range. Furthermore, various combination and formation, and other combination and formation including one, more than one or less than one element may be made within the spirit and scope of the present disclosure.

What is claimed is:

1. A radar device comprising:
a transmitting antenna having at least one element antenna; and
a receiving antenna having a plurality of element antennas, wherein:
the plurality of element antennas of the receiving antenna are arranged at different positions in a first direction and a second direction perpendicular to the first direction;
a distance between two adjacent element antennas among the plurality of element antennas of the receiving antenna in the first direction is equal to each other; and
a distance between two adjacent element antennas among the plurality of element antennas of the receiving antenna in the second direction is equal to each other.

2. The radar device according to claim 1, wherein:
the plurality of element antennas of the receiving antenna are arranged so as to be close to a pseudo-random arrangement form.

3. The radar device according to claim 1, wherein:
the plurality of element antennas of the receiving antenna are arranged so as to be close to a point symmetry arrangement form.

4. The radar device according to claim 1, wherein:
the plurality of element antennas of the receiving antenna are arranged so as to be close to a circular arrangement form.

5. The radar device according to claim 1, wherein:
the plurality of element antennas of the receiving antenna are arranged so as to be close to a circular arrangement form with a center of a circle.

6. The radar device according to claim 1, wherein:
two adjacent element antennas in the second direction among the plurality of element antennas of the receiving antenna are arranged so as to face each other with an intermediate position in the second direction interposed therebetween.

7. The radar device according to claim 1, wherein:
a numerical number of the at least one element antenna of the transmitting antenna is defined as N;
a numerical number of the plurality of element antennas of the receiving antenna is defined as M;
an interval between the M element antennas of the receiving antenna in the first direction is defined as N times a first set interval;
an interval between the M element antennas of the receiving antenna in the second direction is defined as a second set interval;
an interval between the N element antennas of the transmitting antenna in the first direction is defined as the first set interval; and
an interval between the N element antennas of the transmitting antenna in the second direction is defined as M times the second set interval.

8. The radar device according to claim 1, wherein:
a numerical number of the at least one element antenna of the transmitting antenna is defined as N;
a numerical number of the plurality of element antennas of the receiving antenna is defined as M;
an interval between the M element antennas of the receiving antenna in the first direction is defined as a first set interval;
an interval between the M element antennas of the receiving antenna in the second direction is defined as N time a second set interval;
an interval between the N element antennas of the transmitting antenna in the first direction is defined as M times the first set interval; and
an interval between the N element antennas of the transmitting antenna in the second direction is defined as the second set interval.

9. The radar device according to claim 1, wherein:
a numerical number of the at least one element antenna of the transmitting antenna is equal to or more than three;
a numerical number of the plurality of element antennas of the receiving antenna is defined as M;
a first element antenna of the transmitting antenna provides a reference antenna;
an interval between the first element antenna and a second element antenna in the first direction is defined as a first set interval;
an interval between the first element antenna and the second element antenna in the second direction is defined as M times a second set interval;
an interval between the second element antenna and a third element antenna in the first direction is defined as M times the first set interval;
an interval between the second element antenna and the third element antenna in the second direction is defined as the second set interval;

an interval between the M element antennas of the receiving antenna in the first direction is equal to twice the first set interval; and an interval between the M element antennas of the receiving antenna in the second direction is equal to twice the second set interval.

\* \* \* \* \*